United States Patent
Wen

(10) Patent No.: US 10,645,775 B2
(45) Date of Patent: May 5, 2020

(54) LED DRIVE CIRCUIT AND LED LAMP

(71) Applicant: OPPLE LIGHTING CO., LTD., Shanghai (CN)

(72) Inventor: Wei Wen, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 0 days.

(21) Appl. No.: 16/266,014

(22) Filed: Feb. 2, 2019

(65) Prior Publication Data

US 2019/0174596 A1    Jun. 6, 2019

Related U.S. Application Data

(63) Continuation of application No. PCT/CN2017/095673, filed on Aug. 2, 2017.

(30) Foreign Application Priority Data

Aug. 2, 2016  (CN) .......................... 2016 1 0626520
Aug. 2, 2016  (CN) ...................... 2016 2 0828330 U

(51) Int. Cl.
*H05B 45/10*  (2020.01)
*H05B 45/37*  (2020.01)
(Continued)

(52) U.S. Cl.
CPC ............. *H05B 45/10* (2020.01); *H05B 45/37* (2020.01); *H05B 45/58* (2020.01); *H05B 47/10* (2020.01)

(58) Field of Classification Search
None
See application file for complete search history.

(56) References Cited

U.S. PATENT DOCUMENTS 9,288,867 B2   3/2016 Hsia
9,420,663 B1   8/2016 Hsia
(Continued)

FOREIGN PATENT DOCUMENTS

CN    102595736 A    7/2012
CN    104797058 A    7/2015
(Continued)

OTHER PUBLICATIONS

International Search Report (including English translation) and Written Opinion issued in PCT/CN2017/095673, dated Nov. 1, 2017, 11 pages.
(Continued)

*Primary Examiner* — Jimmy T Vu
*Assistant Examiner* — Laura Yesildag
(74) *Attorney, Agent, or Firm* — Arch & Lake LLP

(57) ABSTRACT

The present disclosure provides a light-emitting diode (LED) drive circuit and an LED lamp. The LED drive circuit includes: a feedback control circuit and a load impedance increasing circuit, where the feedback control circuit acquires the operating current of an LED, compares the operating current with a default threshold, drives the load impedance increasing circuit to operate when the operating current of the LED is greater than or equal to the threshold, and allows the load impedance increasing circuit not to operate when the operating current of the LED is less than the threshold; and the load equivalent impedance of the LED drive circuit is increased when the load impedance increasing circuit operates.

14 Claims, 4 Drawing Sheets

(51) Int. Cl.
*H05B 45/58* (2020.01)
*H05B 47/10* (2020.01)

(56) References Cited

U.S. PATENT DOCUMENTS

| | | | |
|---|---|---|---|
| 2006/0071614 | A1 | 4/2006 | Tripathi et al. |
| 2010/0181925 | A1 | 7/2010 | Ivey |
| 2015/0223303 | A1 | 8/2015 | Hsia |
| 2016/0174311 | A1 | 6/2016 | Hsia |
| 2016/0234897 | A1 | 8/2016 | Hsia |
| 2016/0274170 | A1* | 9/2016 | Nagase ................ H03K 17/687 |
| 2016/0291682 | A1* | 10/2016 | Herfurth ................ H05B 33/08 |
| 2016/0336808 | A1* | 11/2016 | Liu ........................ H02M 7/219 |

FOREIGN PATENT DOCUMENTS

| | | |
|---|---|---|
| CN | 205124089 U | 3/2016 |
| CN | 105715979 A | 6/2016 |
| CN | 106102253 A | 11/2016 |
| CN | 206196082 U | 5/2017 |

OTHER PUBLICATIONS

EP Communication to European Application No. 17836402.2, dated Feb. 13, 2020, (6p).

\* cited by examiner

LED DRIVE CIRCUIT AND LED LAMP

CROSS-REFERENCE TO RELATED APPLICATIONS

This application is based upon and claims the priority of PCT patent application No. PCT/CN2017/095673 filed on Aug. 2, 2017 which claims the priority of Chinese Patent Application No. 201610626520.2 filed on Aug. 2, 2016 and Chinese Patent Application No. 201620828330.4 filed on Aug. 2, 2016, the entire content of all of which is hereby incorporated by reference herein for all purposes.

TECHNICAL FIELD

The present disclosure relates to the technical field of illumination, particularly to a light-emitting diode (LED) drive circuit and an LED lamp.

BACKGROUND

The high luminous efficiency, long life and mercury-free characteristics of LEDs have made it a trend to replace the fluorescent tubes with LED tubes. There are two main ways for this replacement application. One way is to completely remove the original fluorescent tube and ballast, and directly input the mains electricity to the LED tube. This method needs to modify the internal wiring of the lamps, additional labor cost is generated. The other way is only to replace the lamp tube. The mounted LED tube needs to be compatible with the original ballast. This kind of replacement is very simple and convenient, and a user can operate it himself without having to hire a professional person, which can eliminate the related labor cost.

SUMMARY

The present disclosure provides an LED drive circuit, an LED lamp and a method of utilizing a LED drive circuit.

One aspect of the present disclosure provides an LED drive circuit, which may include: a feedback control circuit and a load impedance increasing circuit, where the feedback control circuit may acquire the operating current of an LED, may compare the operating current with a default threshold, may drive the load impedance increasing circuit to operate when the operating current of the LED is greater than or equal to the threshold, and may allow the load impedance increasing circuit not to operate when the operating current of the LED is less than the threshold; and the load equivalent impedance of the LED drive circuit may be increased when the load impedance increasing circuit operates.

Another aspect of the present disclosure also provides an LED lamp, which may include a LED drive circuit and at least one LED connected with the LED drive circuit.

The LED drive circuit may include a feedback control circuit and a load impedance increasing circuit, where the feedback control circuit may acquire operating current of an LED, may compare the operating current with a default threshold, may drive the load impedance increasing circuit to operate when the operating current of the LED is greater than or equal to the threshold, and may allow the load impedance increasing circuit not to operate when the operating current of the LED is less than the threshold; and the load equivalent impedance of the LED drive circuit may be increased when the load impedance increasing circuit operates.

The LED drive circuit may be configured to drive the at least one LED to emit light after power-on.

A third aspect of the present disclosure provides a method of utilizing a LED drive circuit. The method may include acquiring, by a feedback control circuit, operating current of an LED, comparing the operating current with a default threshold, driving a load impedance increasing circuit to operate when the operating current of the LED is greater than or equal to the threshold, allowing the load impedance increasing circuit not to operate when the operating current of the LED is less than the threshold, and increasing the load equivalent impedance of the LED drive circuit when the load impedance increasing circuit operates.

It is to be understood that both the foregoing general description and the following detailed description are exemplary and explanatory only and are not restrictive of the present disclosure.

BRIEF DESCRIPTION OF THE DRAWINGS

Various other advantages and benefits will become apparent to one of ordinary skill in the art according to the following detailed description of the examples. The drawings are only for the purpose of illustrating the examples and are not to be construed as the limitation of the present disclosure. Throughout the drawings, the same reference numerals are used to refer to the same parts, in which.

DETAILED DESCRIPTION

Figure 1:
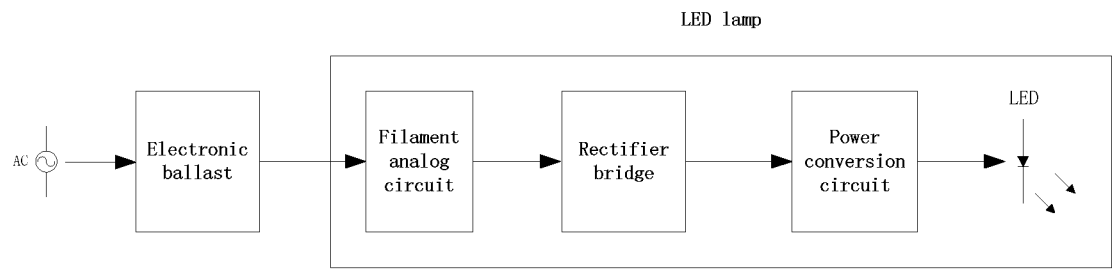
FIG. 1 is a schematic diagram of a conventional LED drive circuit.

Examples of the present disclosure will be described in detail below with reference to the accompanying drawings. Although the examples of the present disclosure have been shown in the drawings, it should be understood that the present disclosure can be implemented in various ways and should not be limited by the examples set forth herein. Rather, these examples are provided so that the disclosure can be more fully understood and the scope of the disclosure can be fully disclosed to those skilled in the art. It should be noted that the technical features in the examples of the present disclosure can be combined with each other without conflict to each other.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In fluorescent lamp ballasts, electronic ballasts occupy a considerable proportion, so a big challenge in replacing the fluorescent tubes is the compatibility with the electronic ballasts. Electronic ballasts have different topological structures. Moreover, as the used power of the LED tube is often much lower than the power of the fluorescent tube, there are many difficulties in making the electronic ballast cooperate with the LED tube. The current mainstream LED drive circuit architecture is as shown in FIG. 1.

In FIG. 1, AC is the mains input. After passing through the electronic ballast, it outputs high-frequency AC voltage and AC current to the LED tube. Inside the LED tube, a filament analog circuit is used to simulate the impedance of the fluorescent filament; a rectifier bridge is used to convert the high-frequency AC voltage and AC current into DC voltage and DC current; and then the power conversion circuit converts them into suitable voltage and current to illuminate LED particles.

Figure 2:
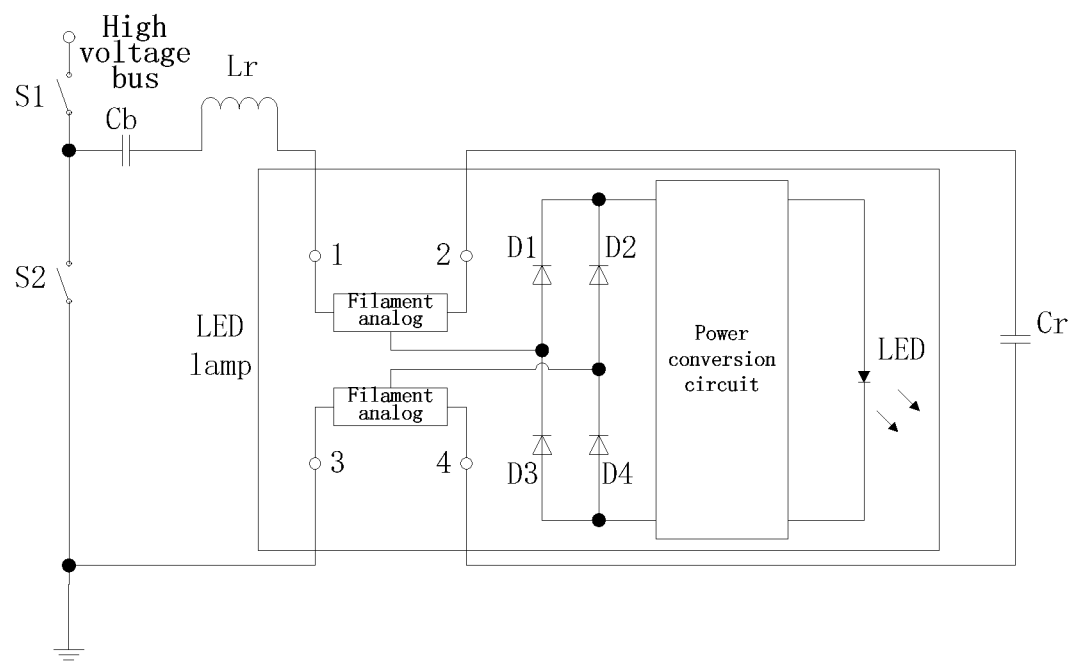
FIG. 2 is a schematically structural circuit diagram of the conventional LED drive circuit.

FIG. 2 is a schematic structural circuit diagram of the conventional LED drive circuit, in which a switch S1, a switch S2, a stopping capacitor Cb, a resonant inductor Lr and a resonant capacitor Cr belong to an internal circuit of the electronic ballast; the switches S1 and S2 form a half-bridge circuit, and high voltage bus voltage is subjected to high frequency conversion; the stopping capacitor Cb removes the DC portion of the high frequency voltage and converts it into an AC high frequency voltage signal; the resonant inductor Lr and the resonant capacitor Cr form a resonant cavity for resonant lighting when the fluorescent lamp is connected; and the resonant inductor Lr has current limiting function after stable operation. The LED tube is connected to the electronic ballast through terminals 1, 2, 3 and 4, passes through the filament analog circuit, and enters a rectifier bridge composed of diodes D1, D2, D3 and D4. The high frequency AC signal from the ballast is converted into a DC signal through the rectifier bridge and outputted to an LED light source through the power conversion circuit.

When the LED tube is connected to a constant-power electronic ballast or a magnetic ring self-excited electronic ballast, since the electronic ballast maintains the output of the power used by corresponding fluorescent lamp, the power is often much larger than the power of the LED tube. Overhigh power will cause the LED tube to trigger protection, overheat or be aged quickly, which can affect the use of the LED tube. If the tube is provided with a corresponding built-in protection, the LED tube will not be compatible with this type of electronic ballast, which will also affect the sales of products.

Thus, it becomes necessary to design an LED drive circuit, which can reduce the output power of an electronic ballast when it is connected to a constant-power electronic ballast or a magnetic ring self-excited electronic ballast, allow the LED tube to work within the design power, and ensure the normal use of the LED tube and the product life.

Figure 3:
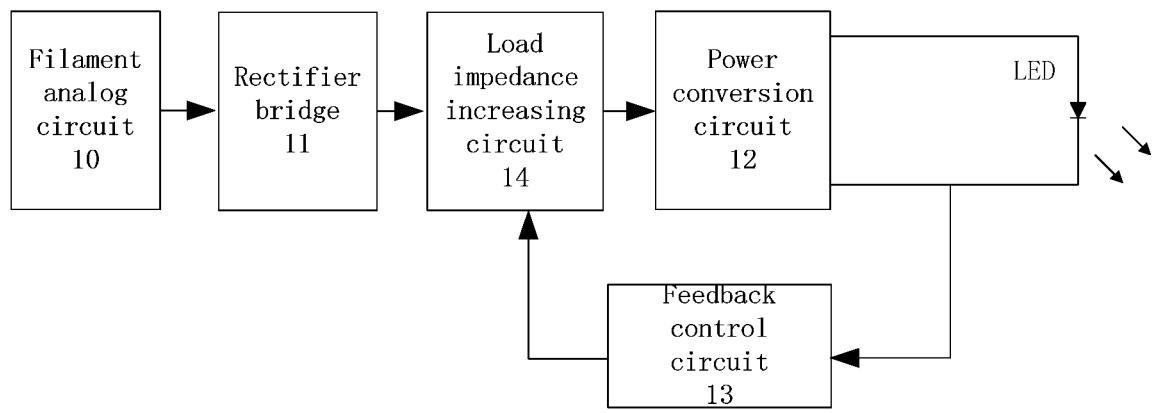
FIG. 3 is a schematic diagram of an LED drive circuit provided by an example of the present disclosure.

FIG. 3 is a schematic diagram of an LED drive circuit provided by an example of the present disclosure. The LED drive circuit provided by the example of the present disclosure can directly cooperate with modules of the conventional LED drive circuit. As shown in FIG. 3, the LED drive circuit provided by the example of the present disclosure comprises a feedback control circuit 13 and a load impedance increasing circuit 14, which can directly cooperate with a filament analog circuit 10, a rectifier bridge 11 and a power conversion circuit 12. The entire LED drive circuit is used to drive at least one LED to emit light after power-on. FIG. 3 only shows one LED. Preferably, the load impedance increasing circuit 14 can be disposed between the rectifier bridge 11 and the above LED.

In the example, the feedback control circuit 13 acquires the operating current of the LED, compares the operating current with a default threshold, drives the load impedance increasing circuit 14 to operate when the operating current of the LED is greater than or equal to the threshold, and allows the load impedance increasing circuit 14 not to operate when the operating current of the LED is less than the threshold.

The load equivalent impedance of the LED drive circuit is increased when the load impedance increasing circuit 14 operates.

The LED drive circuit provided by the example can improve the load equivalent impedance of the entire LED drive circuit when the LED power is overhigh, reduce the output current of the electronic ballast, and achieve the objective of reducing the output power. The LED drive circuit provided by the example is applicable to an LED lamp/tube compatible with the electronic ballast, in particular to a constant-power ballast or a magnetic ring self-excited ballast, which can reduce the output power of the ballast, and allow the LED lamp to work at the rated power to avoid the damage or premature decay of the LED lamp due to over-power usage.

Figure 4:
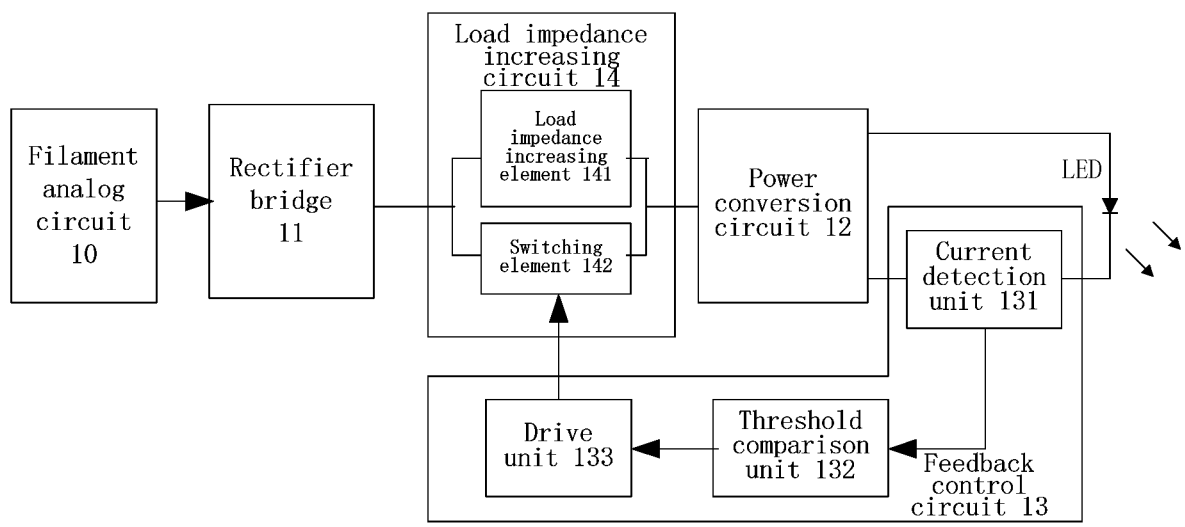
FIG. 4 is a schematic diagram of an LED drive circuit provided by an example of the present disclosure.

In an example of the present disclosure, the feedback control circuit 13 can be implemented by the following architecture. As shown in FIG. 4, the feedback control circuit 13 may include: a current detection unit 131, a threshold comparison unit 132 and a drive unit 133. The current detection unit 131 acquires the operating current of the LED, converts the operating current into a comparative voltage, and inputs the comparative voltage into the threshold comparison unit 132. The threshold comparison unit 132 compares the comparative voltage with the threshold voltage, controls the drive unit 133 to start operating so as to drive the load impedance increasing circuit 14 to operate when the comparative voltage is greater than or equal to the threshold voltage, and allows the drive unit 133 not to operate and allows the load impedance increasing circuit 14 not to operate when the comparative voltage is less than the threshold voltage.

The example provides a proposal for preferably implementing the feedback control circuit 13. The functions of the feedback control circuit 13 can be completely realized based on the current detection unit 131, the threshold comparison unit 132 and the drive unit 133. The architecture is simple and the control logic is clear. The proposal provided by the example adopts a way of comparison after the conversion of a current into a voltage, and can greatly simplify the circuit structure and reduce the cost. At this point, the above threshold is the voltage threshold.

In the above example, the current detection unit 131 can be directly implemented based on a sampling resistor, a transformer or a hall sensor, namely the function of acquiring a current can be implemented by adoption of a sampling resistor, a transformer or a Hall sensor.

Moreover, as shown in FIG. 4, the load impedance increasing circuit 14 can be implemented through a load impedance increasing element 141 and a switching element 142 connected with the load impedance increasing element 141 in parallel. When the switching element 142 is switched on, the load impedance increasing element 141 is bypassed, and the load equivalent impedance of the LED drive circuit does not change. When the switching element 142 is switched off, the load impedance increasing element 141 is connected to the LED drive circuit to increase the load equivalent impedance of the LED drive circuit.

As shown in FIG. 4, the load impedance increasing circuit 14 can be disposed between the rectifier bridge 11 and the power conversion circuit 12. The load impedance increasing element 141 can be implemented by an inductor connected with the rectifier bridge 11 and the power conversion circuit 12 in series. The switching element 142 can be implemented by a power triode, an FET, or a relay. The switching element 142 is controlled by the LED current and is connected to the current detection unit 131 in the LED circuit, which inputs the comparison result into the drive unit 133 by a threshold comparison, and the drive unit 133 controls the 'on' and 'off' of the switching element 142. The current detection unit 131 can feed back the current of the LED. The current is compared with a default threshold. If the current flowing across the LED is less than the default threshold, the drive unit 133 switches on the switching element 142, the load impedance increasing element 141 is shorted, and the operating state is unchanged. When the current flowing across the LED is greater than the default threshold, the drive unit 133 switches off the switch K, the load impedance increasing element 141 is connected between the rectifier bridge 11 and the power conversion circuit 12, and the load equivalent impedance of the LED drive circuit is increased. In the process of specifically comparing the operating current of the LED with the default threshold, the current can be converted into a voltage for comparison, and at this point, it is needed to set the default threshold to be a threshold voltage. In addition, a voltage can be directly sampled in equal proportion through a divider resistor and then compared with the threshold voltage.

The load impedance increasing element 141 can be implemented by an inductor. As the electronic ballast outputs a high-frequency voltage and a high-frequency current, and the inductor reveals certain impedance under a high-frequency current. When the inductor is connected to the circuit, the impedance and the subsequent power conversion circuit form a connection in series, so the load equivalent impedance can be improved. In this way, the output current of electronic ballast can be reduced, and the objective of reducing the output power can be achieved. Meanwhile, due to the series connection between the inductor and the subsequent power conversion circuit, the load impedance characteristic can also be changed. For an electronic ballast adopting a similar charge pump manner to realize passive power factor correction, the total harmonic distortion of the input current can be reduced.

Figure 5:
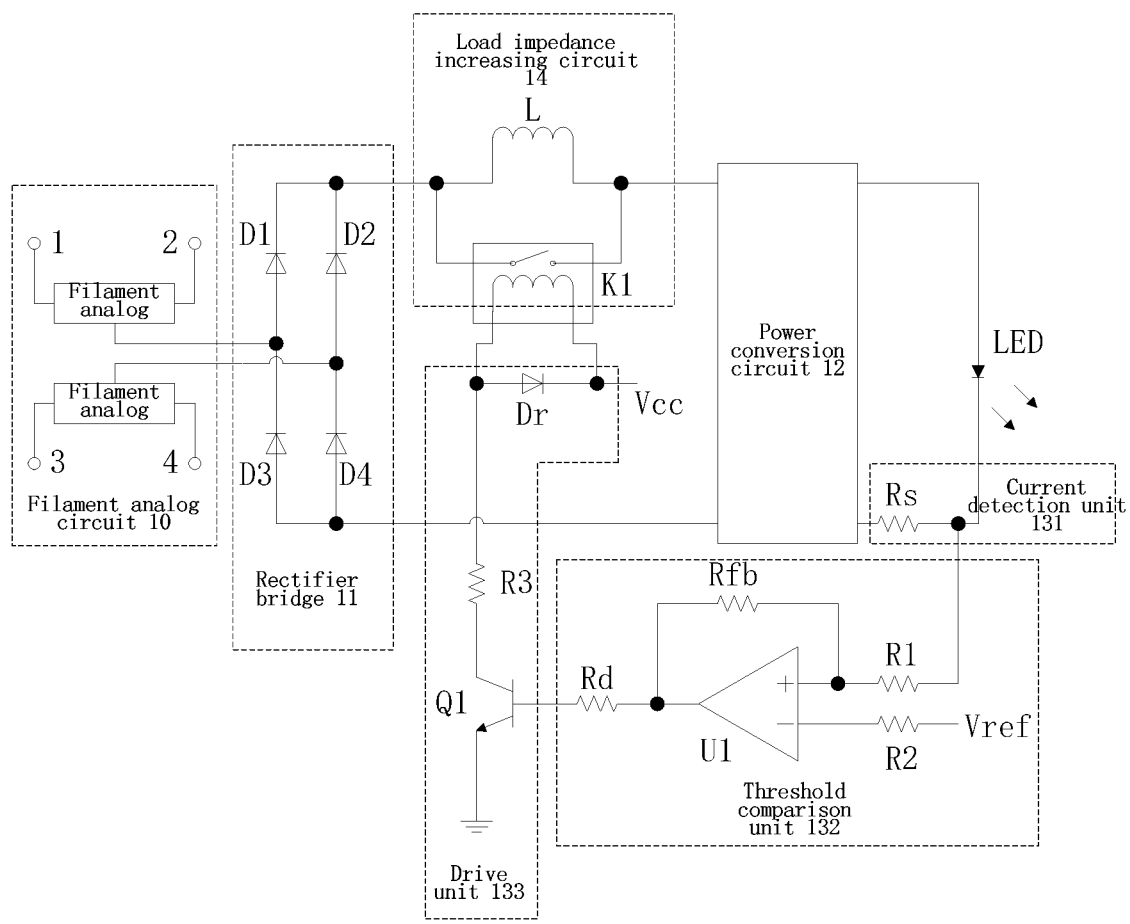
FIG. 5 is a schematically structural circuit diagram of an LED drive circuit provided by an example of the present disclosure.

Based on the above circuit architecture, in a specific implementation, the circuit structure as shown in FIG. 5 can be established.

As shown in FIG. 5, the rectifier bridge 11 is composed of diodes D1, D2, D3 and D4; the load impedance increasing circuit 14 is disposed between the rectifier bridge 11 and the power conversion circuit 12, and it includes an inductor L and a relay K1; and the relay K1 is normally closed without excitation. The current detection unit 131 is implemented by a sampling resistor Rs; the current sampling resistor Rs is connected in series to the LED circuit; and a corresponding voltage, namely a comparative voltage, is generated when the LED current flows across the sampling resistor Rs. The threshold comparison unit 132 is implemented on the basis of a comparator U1. In addition, under the consideration of current limiting, a first resistor R1, a second resistor R2, a third resistor Rfb and a fourth resistor Rd can be additionally arranged. The comparative voltage is fed back to a positive end of the comparator U1 through the first resistor R1; the threshold voltage Vref is connected to a negative end of the comparator U1 through the second resistor R2; an output of the comparator U1 is fed back to the positive end through the third resistor Rfb on one hand, and drives a switch triode Q1 of the drive unit 133 through the fourth resistor Rd on the other hand. A collector of the switch triode Q1 is connected to a drive winding of the relay K1 through a current-limiting resistor R3; R3 is used to limit the current flowing across the drive winding of the relay K1; and the other end of the drive winding is connected with a power source Vcc; and meanwhile, the drive winding is connected with a fly-wheel diode D4 in reverse parallel and used to provide the drive winding with a fly-wheel circuit when the switch triode Q1 is switched off.

As the relay K1 is normally closed without excitation, after the circuit is powered on, the relay K1 remains closed, the inductor L is shorted, and the circuit operates normally. At this point, current flows into the LED and is detected by the sampling resistor Rs. If the current flowing into the LED is less than the default threshold, the negative end of the comparator U1 is larger than the positive end, the comparator U1 outputs a low level, the switch triode Q1 remains off, no exciting current flows across the drive winding of the relay K, and the relay K1 remains closed. If the current flowing across the LED is larger than the default threshold, the negative end of the comparator U1 is smaller than the positive end, the comparator U1 outputs a high level, the switch triode Q1 is switched on, and the power source Vcc provides current which flows into the drive winding of the relay K1, so that the relay K1 is turned off, and the inductor L is connected in the circuit, so as to reduce the output power of the electronic ballast and reduce the current flowing into the LED.

The third resistor Rfb is used for positive feedback. When the comparator U1 outputs a high level, the high level is fed back to the positive end and inputted through the third resistor Rfb. Even though the comparative voltage fed back by the sampling resistor Rs is reduced due to the reduced LED current, due to the feedback of the third resistor Rfb, the positive end of the comparator U1 is larger than the negative end, and the comparator U1 maintains high level output.

Figure 6:
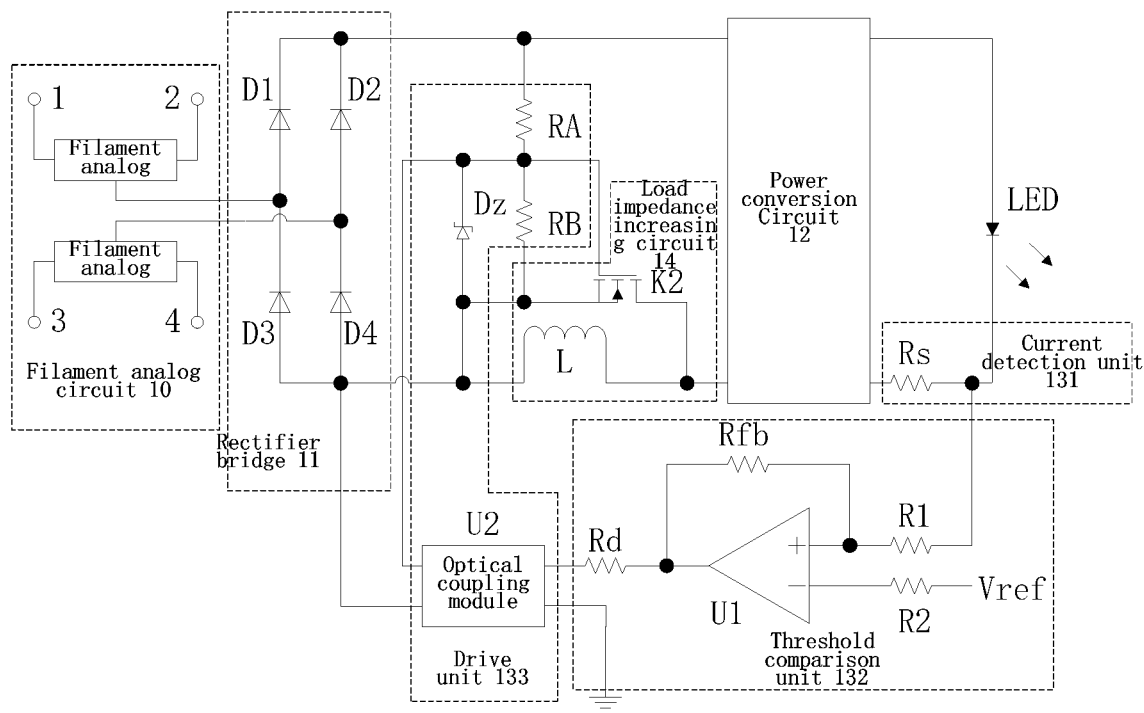
FIG. 6 is a schematically structural circuit diagram of an LED drive circuit provided by another example of the present disclosure.

Moreover, based on the above circuit architecture, in a specific implementation, a circuit structure as shown in FIG. 6 can also be established.

In the circuit as shown in FIG. 6, the current detection unit 131 and the threshold comparison unit 132 have a same structure as the current detection unit 131 and the threshold comparison unit 132 in the circuit as shown in FIG. 5. The load impedance increasing circuit 14 includes an inductor L and an FET K2; two ends of the inductor L1 are connected with the FET K2 in parallel; a gate electrode of the FET K2 drives a bus from the rectifier bridge 11; the bus is connected after being subjected to voltage dividing through the first divider resistor RA and the second divider resistor RB and is used to limit the driving voltage when the gate electrode and a source electrode of the FET K2 are connected to a voltage regulator diode Dz. The LED current is detected by the sampling resistor Rs and fed back to the positive end of the comparator U1; the threshold voltage Vref is connected to the negative end of the comparator U1 through the second resistor R2; an output of U1 is fed back to the positive end for input through the third resistor Rfb on one hand, and connected to an optical coupling module U2 through the fourth resistor Rd on the other hand; and the optical coupling module U2 is used to provide a drive 'off' signal to control the 'on' or 'off' of the FET K2.

When the circuit is powered on, the bus voltage of the rectifier bridge provides a drive bias to the FET K2 through the first divider resistor RA and the second divider resistor RB, so that the FET K2 can be saturated and switched on. When the current flowing across the LED is not large, the comparative voltage fed back by the sampling resistor Rs is smaller than the voltage threshold Vref, the comparator U1 outputs a low level, no drive current flows across the optical coupling module U2, the optical coupling module U2 remains 'off', the switch K remains 'on', so that the inductor L is bypassed, and the original work cannot be affected. When the output power of the electronic ballast is overlarge, the current flowing across the LED is larger and exceeds the default threshold, the positive end of the comparator U1 is larger than the negative end, the comparator U1 outputs a high level and drives the optical coupling module U2. The conduction of the optical coupling module U2 reduces the voltage of the gate electrode of the FET K2, the FET K2 is switched off, the inductor L is connected to the circuit, and the output power of the electronic ballast is reduced.

An example of the present disclosure also provides an LED lamp, which comprises any foregoing LED drive circuit and at least one LED connected with the LED drive circuit. The LED drive circuit is used to drive the at least one LED to emit light after power-on.

The examples of the present disclosure provide an LED drive circuit, which is applicable to an LED lamp compatible with an electronic ballast, in particular to a constant-power ballast or a magnetic ring self-excited ballast. The drive circuit can reduce the output power of the ballast, and allows the LED lamp to work at a rated power to avoid the damage or premature decay of the LED lamp due to over-power usage. Meanwhile, the drive circuit can further improve the harmonic distortion of the input current for electronic ballasts that adopt passive power factor correction.

The present disclosure provides an LED drive circuit and an LED lamp.

One aspect of the present disclosure provides an LED drive circuit, which comprises: a feedback control circuit and a load impedance increasing circuit, wherein the feedback control circuit acquires the operating current of an LED, compares the operating current with a default threshold, drives the load impedance increasing circuit to operate when the operating current of the LED is greater than or equal to the threshold, and allows the load impedance increasing circuit not to operate when the operating current of the LED is less than the threshold; and the load equivalent impedance of the LED drive circuit is increased when the load impedance increasing circuit operates.

Optionally, the LED drive circuit further comprises: a rectifier bridge, wherein the load impedance increasing circuit is disposed between the rectifier bridge and the LED.

Optionally, the load impedance increasing circuit comprises: a load impedance increasing element and a switching element connected with the load impedance increasing element in parallel; when the switching element is switched on, the load impedance increasing element is bypassed; and when the switching element is switched off, the load impedance increasing element is connected to the LED drive circuit to increase the load equivalent impedance of the LED drive circuit.

Optionally, the switching element comprises: a power triode, a field effect transistor (FET) or a relay.

Optionally, the threshold is a threshold voltage; the feedback control circuit comprises: a current detection unit, a threshold comparison unit and a drive unit, the current detection unit acquiring the operating current of the LED, converting the operating current into comparative voltage, and inputting the comparative voltage into the threshold comparison unit, and the threshold comparison unit comparing the comparative voltage with the threshold voltage, controlling the drive unit to start operating so as to drive the load impedance increasing circuit to operate when the comparative voltage is greater than or equal to the threshold voltage, and allowing the drive unit not to operate and allowing the load impedance increasing circuit not to operate when the comparative voltage is less than the threshold voltage.

Optionally, the current detection unit comprises: a sampling resistor, a transformer or a Hall sensor.

Optionally, the current detection unit comprises a sampling resistor, the sampling resistor being connected with the LED in series, and the comparative voltage being generated when the operating current of the LED flows across the sampling resistor.

Optionally, the threshold comparison unit comprises: a comparator, the sampling resistor being connected to a positive end of the comparator, the threshold voltage being connected to a negative end of the comparator, an output of the comparator being connected to the drive unit, and the output of the comparator being also connected to the positive end of the comparator.

Optionally, the threshold comparison unit further comprises: a first resistor, a second resistor, a third resistor and a fourth resistor, the sampling resistor being connected to the positive end of the comparator through the first resistor, the threshold voltage being connected to the negative end of the comparator through the second resistor, the output of the comparator being connected to the positive end of the comparator through the third resistor, and the output of the comparator being connected to the drive unit through the fourth resistor.

Optionally, the drive unit comprises: a switch triode, a current-limiting resistor and a fly-wheel diode, a base of the switch triode being connected to an output of the threshold comparison unit, an emitter of the switch triode being grounded, a collector of the switch triode being connected to the fly-wheel diode through the current-limiting resistor, and the fly-wheel diode being connected with the switching element of the load impedance increasing circuit in reverse parallel.

Optionally, the LED drive circuit further comprises a power conversion circuit; the load impedance increasing element is an impedance inductor; the switching element is a relay; the relay comprises a drive winding and a relay switch; one end of the drive winding is connected to the collector of the switch triode through the current-limiting resistor; the other end of the drive winding is connected to a power source; the drive winding is connected with the fly-wheel diode in reverse parallel; the relay switch is connected with the impedance inductor in parallel; and two ends of the impedance inductor are respectively connected with the rectifier bridge and the power conversion circuit.

Optionally, the LED drive circuit further comprises: a power conversion circuit; the drive unit comprises: an optical coupling module, a first divider resistor, a second divider resistor and a voltage regulator diode; an input of the optical coupling module is connected to an output of the threshold comparison unit; an output of the optical coupling module is connected to the load impedance increasing circuit; a bus of the rectifier bridge is connected to the switching element of the load impedance increasing circuit through the first divider resistor and the second divider resistor; and two ends of the voltage regulator diode are respectively connected with two ends of the switching element.

Optionally, the load impedance increasing element is an impedance inductor; the switching element is an FET; the bus of the rectifier bridge is connected to a gate electrode of the FET through the first divider resistor and the second divider resistor; the gate electrode of the FET is also connected to the output of the optical coupling module; the gate electrode and a source electrode of the FET are respectively connected with two ends of the voltage regulator diode; two ends of the impedance inductor are respectively connected with the source electrode and a drain electrode of the FET; one end of the impedance inductor, connected with the source electrode of the FET, is also connected with the rectifier bridge; and one end of the impedance inductor, connected with the drain electrode of the FET, is also connected with the power conversion circuit.

Another aspect of the present disclosure also provides an LED lamp, which comprises any foregoing LED drive circuit and at least one LED connected with the LED drive circuit. The LED drive circuit is configured to drive the at least one LED to emit light after power-on.

The present disclosure provides a method of utilizing a light-emitting diode (LED) drive circuit. The method may include acquiring, by a feedback control circuit, operating current of an LED, comparing the operating current with a default threshold, driving a load impedance increasing circuit to operate when the operating current of the LED is greater than or equal to the threshold, allowing the load impedance increasing circuit not to operate when the operating current of the LED is less than the threshold, and increasing the load equivalent impedance of the LED drive circuit when the load impedance increasing circuit operates.

The method may also include connecting a switching element of the load impedance increasing circuit with a load impedance increasing element of the load impedance increasing circuit in parallel; when the switching element is switched on, bypassing the load impedance increasing element; and when the switching element is switched off, connecting the load impedance increasing element to the LED drive circuit to increase the load equivalent impedance of the LED drive circuit.

The LED drive circuit provided by the examples of the present disclosure is applicable to the LED lamp compatible with the electronic ballast, especially for the constant-power ballast or the magnetic ring self-excited ballast, it can reduce the output power of the ballast, and can allow the LED lamp to work at a rated power to avoid the damage or premature decay of the LED lamp due to over-power usage.

The above and other objects, advantages and characteristics of the present disclosure will become apparent to those skilled in the art according to the detailed description of the examples of the present disclosure with reference to the accompanying drawings.

In the description provided herein, numerous specific details are set forth. However, it should be understood that the examples of the present disclosure can be practiced without these specific details. In some examples, well-known methods, structures and techniques have not been shown in detail so as not to obscure the understanding of the description.

Similarly, it should be understood that, in order to simplify the present disclosure and help understanding one or more of various aspects of the present disclosure, in the above description of the examples of the present disclosure, the features of the present disclosure are sometimes grouped together into a single example, drawing, or description thereof.

It should be understood by those skilled in the art that the modules in the devices of the examples can be adaptively changed and disposed in one or more devices different from the example. The modules, units or components in the examples can be combined into one module, one unit, or one component, and further can be divided into a plurality of sub-modules, sub-units, or sub-components. Except that at least some of such features and/or processes or units are mutually exclusive, all the features disclosed in the description (including the accompanying claims, abstract and drawings) or all the processes or units of any method or device so disclosed can be randomly combined. Unless otherwise specified, each feature disclosed in the description (including the accompanying claims, abstract and drawings) can be replaced by an alternative feature that provides the same, equivalent, or similar purpose.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Moreover, it should be understood by those skilled in the art that although some examples described herein include some features but not other features that are not included in other examples, the combinations of the features of different examples are intended to fall within the scope of the present disclosure and form different examples.

The component examples of the present disclosure can be implemented in hardware, or in a software module running on one or more processors, or in a combination thereof. It should be understood by those skilled in the art that a microprocessor or a digital signal processor (DSP) can be used in practice to implement some or all of the functions of some or all of the components in the LED driver circuit provided by the examples of the present disclosure. The disclosure can also be implemented as a device or a device program (e.g., a computer program and a computer program product) for executing some or all of the methods described herein. Such a program for implementing the present disclosure can be stored on a computer readable medium or can be in the form of one or more signals. Such signals can be downloaded from the Internet website, or provided on the carrier signal, or provided in any other form.

It is to be noted that the above examples are illustrative of the present disclosure and are not intended to limit the present disclosure, and that alternative examples can be designed by those skilled in the art without departing from the scope of the appended claims. In the claims, any reference numeral placed between parentheses shall not be construed as the limitation of the claims. The word "comprise" does not exclude the presence of the elements or steps that are not recited in the claims. The word "a" or "an" disposed before the element does not exclude the presence of a plurality of such elements. The present disclosure can be implemented by hardware comprising several distinct elements and by a suitably programmed computer. In the unit claims enumerating several devices, several of these devices can be specifically embodied by the same hardware item. The use of the words 'first,' 'second,' and the like does not indicate any order. These words can be interpreted as a name.

It will be appreciated by those skilled in the art that although a plurality of examples of the present disclosure have been shown and described herein, many other variations or modifications in accordance with the principle of the present disclosure can be directly determined or deduced according to the content disclosed in the present disclosure without departing from the spirit and the scope of the present disclosure. So, the scope of the present disclosure should be understood and construed as covering all such other variations or modifications.

What is claimed is:

1. A light-emitting diode (LED) drive circuit, comprising:
a feedback control circuit, which comprises a current detector, a threshold comparison circuit and a driver, and
a load impedance increasing circuit, wherein:
the feedback control circuit acquires operating current of an LED, converts the operating current into comparative voltage, compares the comparative voltage with a default threshold voltage, drives the load impedance increasing circuit to operate when the comparative voltage of the LED is greater than or equal to the threshold voltage, and allows the load impedance increasing circuit not to operate when the comparative voltage of the LED is less than the threshold voltage; and
the load equivalent impedance of the LED drive circuit is increased when the load impedance increasing circuit operates,
wherein the current detector further comprises a sampling resistor;
wherein the threshold comparison circuit further comprises: a comparator, a first resistor, a second resistor, a third resistor and a fourth resistor; and
wherein the sampling resistor is connected to a positive end of the comparator through the first resistor, the threshold voltage is connected to a negative end of the comparator through the second resistor, an output of the comparator is connected to the positive end of the comparator through the third resistor, and the output of the comparator is connected to the driver through the fourth resistor.

2. The LED drive circuit according to claim 1, further comprising: a rectifier bridge, and wherein the load impedance increasing circuit is disposed between the rectifier bridge and the LED.

3. The LED drive circuit according to claim 2, wherein:
the load impedance increasing circuit comprises a load impedance increasing element and a switching element connected with the load impedance increasing element in parallel;
when the switching element is switched on, the load impedance increasing element is bypassed; and when the switching element is switched off, the load impedance increasing element is connected to the LED drive circuit to increase the load equivalent impedance of the LED drive circuit.

4. The LED drive circuit according to claim 3, wherein the switching element comprises: a power triode, a field effect transistor (FET) or a relay.

5. The LED drive circuit according to claim 3, wherein:
the threshold is a threshold voltage; the feedback control circuit comprises a current detection unit, a threshold comparison unit and a drive unit, and
wherein the current detection unit detector acquires the operating current of the LED, converts the operating current into comparative voltage, and inputs the comparative voltage into the threshold comparison circuit; and
the threshold comparison circuit compares the comparative voltage with the threshold voltage, controls the drive unit driver to start operating so as to drive the load impedance increasing circuit to operate when the comparative voltage is greater than or equal to the threshold voltage, and allows the drive unit driver not to operate and allows the load impedance increasing circuit not to operate when the comparative voltage is less than the threshold voltage.

6. The LED drive circuit according to claim 5, wherein the current detector comprises: a sampling resistor, a transformer or a Hall sensor.

7. The LED drive circuit according to claim 6, wherein the sampling resistor is connected with the LED in series, and the comparative voltage is generated when the operating current of the LED flows across the sampling resistor.

8. The LED drive circuit according to claim 3, wherein the driver comprises:
a switch triode, a current-limiting resistor and a fly-wheel diode, and
wherein a base of the switch triode is connected to an output of the threshold comparison circuit, an emitter of the switch triode is grounded, a collector of the switch triode is connected to the fly-wheel diode through the current-limiting resistor, and the fly-wheel diode is connected with the switching element of the load impedance increasing circuit in reverse parallel.

9. The LED drive circuit according to claim 8, further comprising a power conversion circuit, and
wherein the load impedance increasing element is an impedance inductor; the switching element is a relay, the relay comprising a drive winding and a relay switch,
wherein one end of the drive winding is connected to the collector of the switch triode through the current-limiting resistor, another end of the drive winding is connected to a power source, the drive winding is connected with the fly-wheel diode in reverse parallel, the relay switch is connected with the impedance inductor in parallel, and two ends of the impedance inductor are connected with the rectifier bridge and the power conversion circuit.

10. The LED drive circuit according to claim 3, further comprising a power conversion circuit, wherein the driver comprises:
an optical coupling module, a first divider resistor, a second divider resistor and a voltage regulator diode, and wherein an input of the optical coupling module is connected to an output of the threshold comparison circuit, an output of the optical coupling module is connected to the load impedance increasing circuit, a bus of the rectifier bridge is connected to the switching element of the load impedance increasing circuit through the first divider resistor and the second divider resistor, and two ends of the voltage regulator diode are connected with two ends of the switching element.

11. The LED drive circuit according to claim 10, wherein the load impedance increasing element is an impedance inductor, and the switching element is an FET, and
wherein the bus of the rectifier bridge is connected to a gate electrode of the FET through the first divider resistor and the second divider resistor, the gate electrode of the FET is connected to the output of the optical coupling module, the gate electrode and a source electrode of the FET are connected with two ends of the voltage regulator diode, two ends of the impedance inductor are connected with the source electrode and a drain electrode of the FET, and one end of the impedance inductor connected with the source electrode of the FET is connected with the rectifier bridge; and another end of the impedance inductor connected with the drain electrode of the FET is connected with the power conversion circuit.

12. An LED lamp, comprising a LED drive circuit and at least one LED connected with the LED drive circuit, wherein:
the LED drive circuit comprises a feedback control circuit and a load impedance increasing circuit, wherein
the feedback control circuit comprises a current detector, a threshold comparison circuit and a driver, acquires operating current of an LED, converts the operating current into comparative voltage, compares the comparative voltage with a default threshold voltage, drives the load impedance increasing circuit to operate when the comparative voltage of the LED is greater than or equal to the threshold voltage, and
allows the load impedance increasing circuit not to operate when the comparative voltage of the LED is less than the threshold voltage;
the load equivalent impedance of the LED drive circuit is increased when the load impedance increasing circuit operates;
the current detector further comprises a sampling resistor;
the threshold comparison circuit further comprises: a comparator, a first resistor, a second resistor, a third resistor and a fourth resistor; and the sampling resistor is connected to a positive end of the comparator through the first resistor, the threshold voltage is connected to a negative end of the comparator through the second resistor, an output of the comparator is connected to the positive end of the comparator through the third resistor, and the output of the comparator is connected to the driver through the fourth resistor; and
the LED drive circuit is configured to drive the at least one LED to emit light after power-on.

13. A method of utilizing a light-emitting diode (LED) drive circuit, comprising:
acquiring, by a feedback control circuit, operating current of an LED,
converting the operating current into comparative voltage,
comparing the comparative voltage with a default threshold voltage,
driving a load impedance increasing circuit to operate when the comparative voltage of the LED is greater than or equal to the threshold voltage,
allowing the load impedance increasing circuit not to operate when the comparative voltage of the LED is less than the threshold voltage, and
increasing the load equivalent impedance of the LED drive circuit when the load impedance increasing circuit operates, wherein:
the feedback control circuit comprises a current detector, a threshold comparison circuit and a driver;
the current detector further comprises a sampling resistor;
the threshold comparison circuit further comprises: a comparator, a first resistor, a second resistor, a third resistor and a fourth resistor; and
the sampling resistor is connected to a positive end of the comparator through the first resistor, the threshold voltage is connected to a negative end of the comparator through the second resistor, an output of the comparator is connected to the positive end of the comparator through the third resistor, and the output of the comparator is connected to the driver through the fourth resistor.

14. The method of claim 13, further comprising:
connecting a switching element of the load impedance increasing circuit with a load impedance increasing element of the load impedance increasing circuit in parallel;
when the switching element is switched on, bypassing the load impedance increasing element; and
when the switching element is switched off, connecting the load impedance increasing element to the LED drive circuit to increase the load equivalent impedance of the LED drive circuit.

* * * * *